Figure 5:
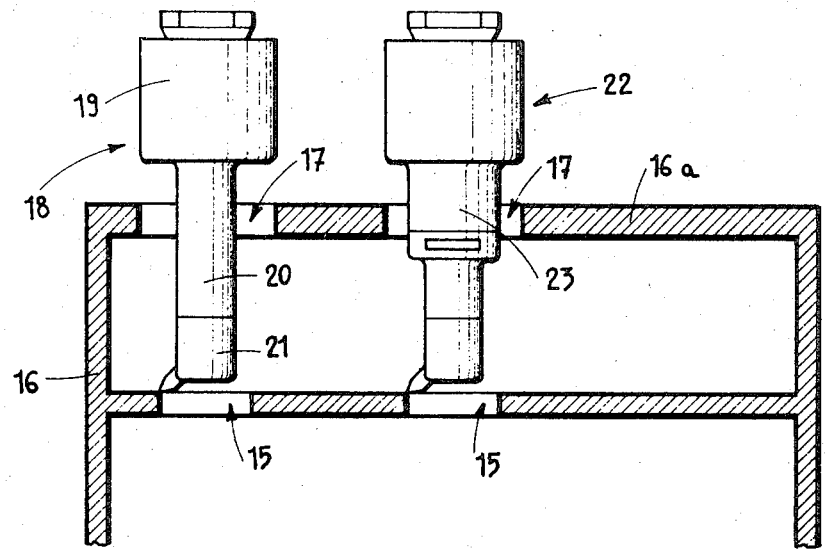

United States Patent [19]
Degen

[11] 3,822,960
[45] July 9, 1974

[54] SET OF ELEMENTS COMBINABLE IN DIFFERENT ARRANGEMENTS AS WORKING TOOLS FOR MACHINE TOOLS

[75] Inventor: Jean Degen, Geneva, Switzerland

[73] Assignee: Societe Genevoise D'Instruments de Physique, Geneva, Switzerland

[22] Filed: Jan. 30, 1973

[21] Appl. No.: 328,014

Related U.S. Application Data

[63] Continuation-in-part of Ser. No. 91,690, Nov. 23, 1970, abandoned.

[52] U.S. Cl. .............................................. 408/226
[51] Int. Cl. .......................................... B23b 51/00
[58] Field of Search .......... 408/226, 238, 239, 713; 403/299, 296, 292, 3; 175/320

[56] References Cited
UNITED STATES PATENTS

| | | | |
|---|---|---|---|
| 3,153,356 | 10/1964 | Dearborn | 408/226 |
| 3,521,507 | 7/1970 | Yogus et al. | 408/226 |

Primary Examiner—Francis S. Husar
Attorney, Agent, or Firm—Ross, Ross & Flavin

[57] ABSTRACT

A tooling system allowing interchangeable use of different cutting tools for machine tools and comprehending a plurality of adapters, a plurality of intermediary members of different lengths and diameters, and a plurality of tool-holding heads, with each adapter being provided at one of its ends with means permitting mounting on the spindle of a machine tool and at its other end with a threaded boring for receiving a selected one of the intermediary members, and with a threaded portion of the intermediary member being threaded in the threaded portion of the adapter, and with intermediary members being provided each with a shoulder having an annular plane perpendicular to the axis of the tool and being in contact, when the intermediary member is threaded on the adapter, with a terminal axial face of the latter and with perfect coaxiality between adapter and intermediary member.

1 Claim, 10 Drawing Figures

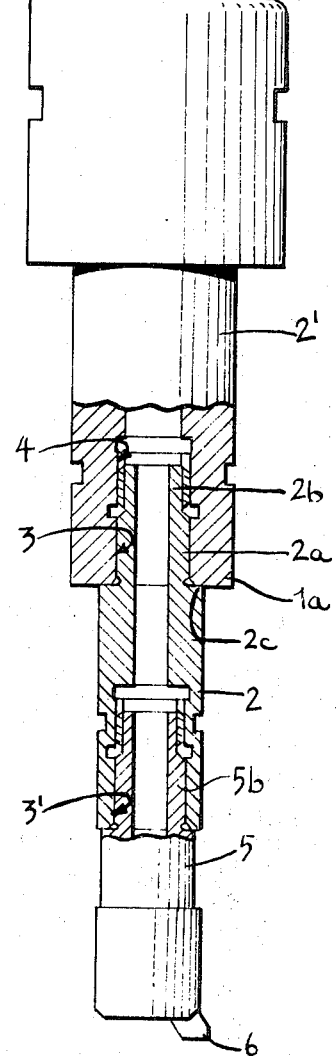
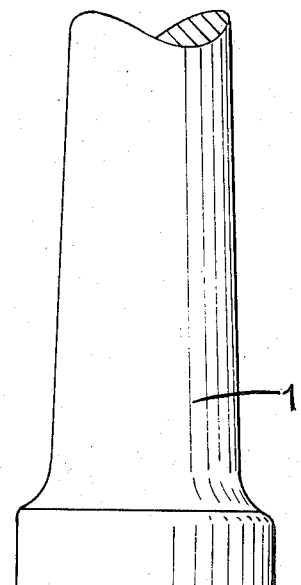
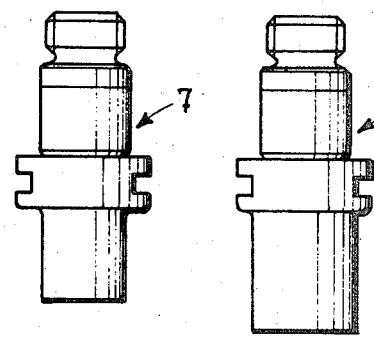
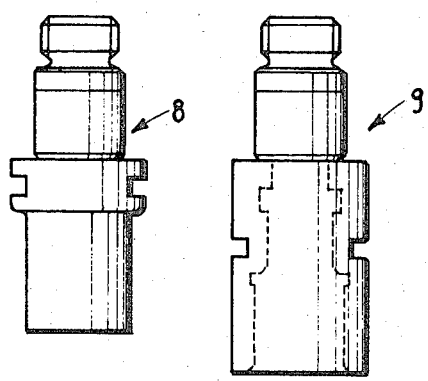
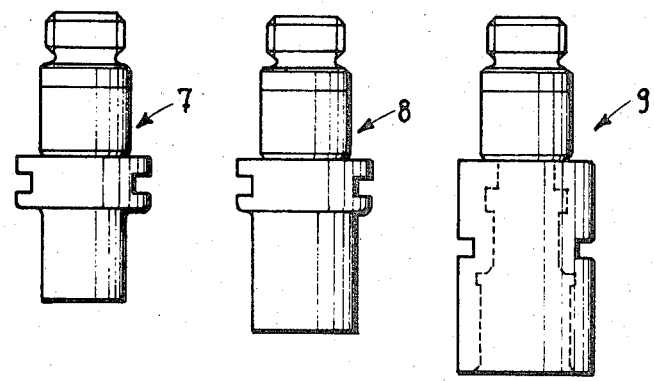
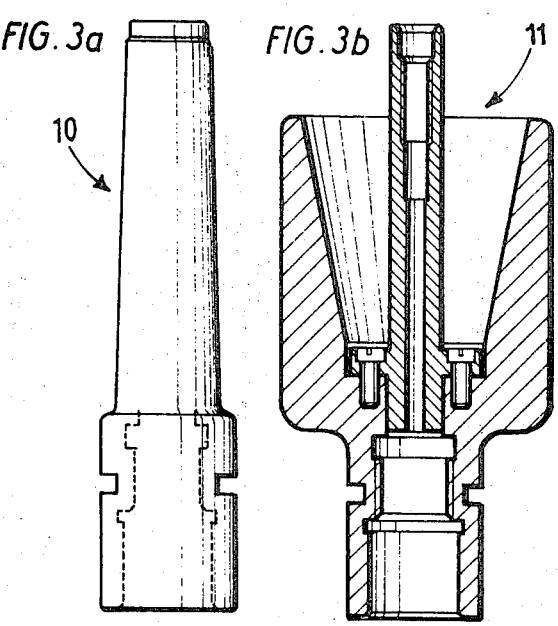
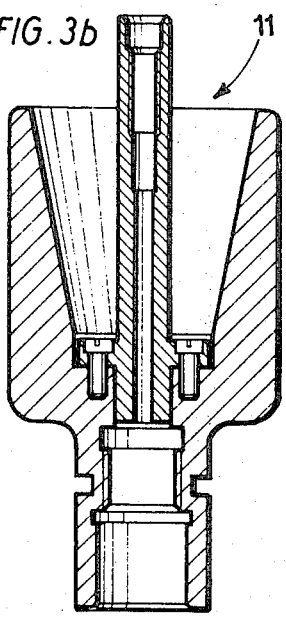
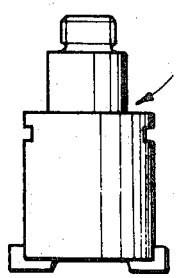
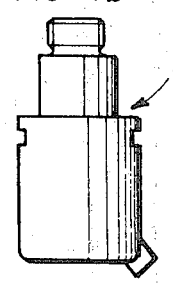
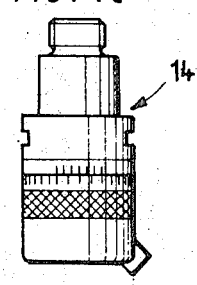
PATENTED JUL 9 1974     3,822,960
SHEET 1 OF 2
FIG. 2a    FIG. 2b    FIG. 2c
FIG. 3a    FIG. 3b
FIG. 4a    FIG. 4b    FIG. 4c
FIG. 1

SET OF ELEMENTS COMBINABLE IN DIFFERENT ARRANGEMENTS AS WORKING TOOLS FOR MACHINE TOOLS

This is a continuation-in-part of my copending application Ser. No. 91,690 filed Nov. 23, 1970 and now abandoned.

The present invention has for its object the provision of a set of elements combinable in different arrangements for the realisation of working tools for machine tools.

The use of machine tools provided with diverse securing means for the tools (Morse cones or others), and the needs of the working operation, which require the use of several different working tools and tool holders which differ especially by their type and by their length, produce a situation wherein, to respond to all possibilities, it is necessary to have available a very large number of different tools.

The purpose of the present invention is to reduce the number of different tools while furnishing means permitting the operator to make, by means of different elements, the tools he needs.

The set according to the invention is characterized by the fact that it comprises a set of adapters, a set of intermediary members and a set of tool-holding heads, each adapter being provided at one of its ends with means permitting its mounting on the spindle of the machine tool and, at its other end, with means intended to receive the intermediary members which are of different lengths and/or diameters, the whole in such a way that by the combination of the elements - adapters, intermediary members, and tool holding heads - -, it is possible to realize several working tools capable of being mounted on machines the securing means of which are different.

The drawings show, by way of example, several embodiments of the invention:

FIG. 1 is an elevational view, in partial section, of a tool obtained by means of the present set;

FIGS. 2a, 2b, and 2c represent a set of three intermediary members in elevational views;

FIGS. 3a, and 3b represent a set of two adapters, one of them is represented in an elevational view, in FIG. 3a, and the other one of them is sectionally represented in FIG. 3b;

FIGS. 4a, 4b and 4c represent a set of three tool-holding heads in elevational views; and FIG. 5 is a sectional view of a portion of a work piece during its working.

The tool represented in FIG. 1 comprises an adapter 1, of generally conical shape, intended to be secured to the cone (Morse cone or other) of the spindle of a machine tool.

The tool additionally comprises one or more axially aligned, releasably interconnected intermediary or lengthening members 2 and 2', and a boring head 5 provided with a cutting tool 6, the boring head being releasably interconnected with lowermost intermediary or lengthening member 2.

The intermediary members, while being of different lengths and diameters, have identical mating cylindrical portions and bores for engagement with each other. In FIG. 1, lower intermediary member 2 has a cylindrical portion 2a engaged in a corresponding bore 3 in the lower end 1a of upper intermediary member 2'. The bore 3 is terminated adjacent its inner end in a threaded portion 4 in which a threaded portion 2b of intermediary member 2 is threaded. Upon tightening, the planar face of a shoulder 2c of lower intermediary member 2 is butted against the lower face of upper intermediary member 2'.

Boring head 5 is provided with a similar cylindrical portion 5b receivable in a corresponding bore 3' in the lower end of lower intermediary member 2.

The adapter is provided with a similar bore, not shown, in its lower end for receiving a cylindrical portion, not shown, on the upper end of upper intermediary member 2'. By this arrangement, the adapter, intermediary members 2 and 2' and boring tool 5 are perfectly coaxial, the bearing surfaces of the shoulders 2c which bear against the extremity of each portion 1a being situated at a greater distance from the axis of the tool than is the case when tightening is realized by means of conical surfaces, thus insuring a better seating. The set as represented comprises, in addition to the intermediary members 2 and 2', a set of these members, three of which, designated by 7, 8 and 9, have been represented respectively in FIGS. 2a, 2b and 2c, which differ one from the other by their length on the one hand, and by the diameter of their lower portions which receive the boring head, on the other hand.

The set as represented comprises, in addition to the adapter 1, a set of adapters, two of which have been represented, designated by 10 and 11, respectively in FIGS. 3a and 3b, which differ one from the other by the shape of their upper portions to be adapted to the securing means of the spindle of the machine tool, and by the diameters of their lower portions.

Finally, the set comprises, in addition to the boring head 5, a set of boring heads, three of which have been represented, designated by 12, 13 and 14, respectively in FIGS. 4a, 4b and 4c, which correspond to the most conventional types. The head 12 of FIG. 4a is a double-blade boring head, this type of blade being radially adjustable for the rough shaping of the work piece; the head 13 of FIG. 4b is a one-blade head with the adjustment of the position of the head being obtained by a differential screw for a half finishing operation. Finally, the head 14 of FIG. 4c is also a one-blade head, but with a micrometric adjustment of the position of the blade for half finishing and for finishing operations.

Using the present set, and exercising a judicious combination of the elements - - adapters, intermediary members and boring heads of different types - - the operator can, by means of a small number of different components, realise a very large number of different tools.

It is to be noted that, in spite of the fact that the word "lengthening members" has been used several times in the present specification for designating the intermediary members, these intermediary members can be used not only as lengthening members, but also as reducing members. As a matter of fact, so as to prevent any vibration of the blade of the tool, it is important that the lower end of the tool be of the largest diameter possible. Experience has shown, for instance, that the length of the tool cannot be over five times the diameter of its rod, in the most favorable case, that is to say with a solid rod, otherwise vibrations occur. Consequently, for boring holes such as the holes 15 of the work piece 16 of FIG. 5, which require a relatively long tool rod due to the fact that these holes are accessible only through holes 17 of the upper plate 16a of the work piece 16, there is no advantage to use the tool designated by 18 represented to the left of FIG. 5, which comprises an adapter 19 with an intermediary member 20 and a boring head 21', but it is highly advantageous to use the tool 22 represented to the right of FIG. 5, in which the intermediary member 20 has been replaced by an intermediary member 23, of the same length but of a larger diameter, thereby reducing the risk of vibrations occuring.

When it is necessary to elongate a tool, the diameter thereof must also be changed since it has been ascertained that there must be a given ratio between the length and the diameter so that the tool does not vibrate.

When using a tool of the invention having an intermediary member of maximum diameter, one can work with normal cutting speeds without producing any vibration.

The number of adapters, intermediary members and boring heads of the set can vary from one set to another, whereby a wide variety of tools of great versatility and high precision may be readily formed.

I claim:

1. A tooling system for the realisation of interchangeable use of different cutting tools for machine tools, characterized by, a plurality of adapters, a plurality of intermediary members of different lengths and diameters, and a plurality of boring heads, each adapter being provided at one of its ends with means permitting mounting on the spindle of a machine tool and at its other end with a boring, each intermediary member being provided at one end with a portion engageable in the boring of a selected one of the adapters and at its opposite end with a boring, each boring head being provided at one end with a portion engageable in the boring of a selected one of the intermediary members, the boring heads each being provided with a shoulder annular plane face which is perpendicular to the axis of the tool and is in contact, when the boring head is engaged with the intermediary member, with the terminal axial face of the latter for insuring perfect coaxiality between the boring head and the intermediary member the selected ones of the adapters, intermediary members and boring heads when assembled providing a tool wherein the diameters of the adapter, intermediary members and boring head are ever decreasing in the direction axially from the adapter to the boring head.

* * * * *

UNITED STATES PATENT OFFICE
CERTIFICATE OF CORRECTION

Patent No. 3,822,960            Dated July 9, 1974

Inventor(s) Jean Degen

It is certified that error appears in the above-identified patent and that said Letters Patent are hereby corrected as shown below:

In the heading, insert below line 10,
    identified as [21] Appl.No.: 328,014

--[30] Foreign Application Priority Data

Dec. 4, 1969     Switzerland.....18.059/69 --

Signed and sealed this 10th day of December 1974.

(SEAL)
Attest:

McCOY M. GIBSON JR.           C. MARSHALL DANN
Attesting Officer                 Commissioner of Patents